(12) United States Patent
Longo et al.

(10) Patent No.: US 11,886,933 B2
(45) Date of Patent: Jan. 30, 2024

(54) DYNAMIC LOAD BALANCING BY ANALYZING PERFORMANCE OF VOLUME TO QUALITY OF SERVICE

(71) Applicant: NetApp, Inc., Sunnyvale, CA (US)

(72) Inventors: Austino Longo, Lafayette, CO (US); James Wittig, Boulder, CO (US)

(73) Assignee: NetApp, Inc., Sunnyvale, CA (US)

( * ) Notice: Subject to any disclaimer, the term of this patent is extended or adjusted under 35 U.S.C. 154(b) by 102 days.

(21) Appl. No.: 17/187,376

(22) Filed: Feb. 26, 2021

(65) Prior Publication Data

US 2022/0276907 A1    Sep. 1, 2022

(51) Int. Cl.
  *G06F 9/46* (2006.01)
  *G06F 9/50* (2006.01)
  *G06F 9/48* (2006.01)

(52) U.S. Cl.
  CPC .......... *G06F 9/5083* (2013.01); *G06F 9/4843* (2013.01); *G06F 9/5044* (2013.01); *G06F 2209/501* (2013.01)

(58) Field of Classification Search
  CPC ............. G06F 2209/501; G06F 9/5083; G06F 9/4843; G06F 9/5044
  See application file for complete search history.

(56) References Cited

U.S. PATENT DOCUMENTS

| 8,935,500 | B1 * | 1/2015 | Gulati | G06F 11/3485 |
| | | | | 711/170 |
| 9,547,520 | B1 * | 1/2017 | Bailey | G06F 9/45558 |
| 2021/0105322 | A1 * | 4/2021 | Sakashita | H04L 41/0896 |
| 2022/0229560 | A1 * | 7/2022 | Dar | G06F 3/0653 |

* cited by examiner

*Primary Examiner* — Diem K Cao (57) ABSTRACT

Systems and methods for quality of service management are provided. According to one embodiment, a non-transitory computer-readable medium comprises instructions that when executed by the processing resource cause the processing resource to collect, from a plurality of volumes on a per-volume basis, one or more real-time performance metrics for one or more compute processes executing on the one or more computer systems, generate an inertial parameter for one or more volumes in the plurality of volumes, and generate an instruction that cause a processor to use the real-time performance metrics and the inertial parameter to determine whether to transfer responsibility for a compute process on a first storage server node to a second storage server node.

21 Claims, 7 Drawing Sheets

DYNAMIC LOAD BALANCING BY ANALYZING PERFORMANCE OF VOLUME TO QUALITY OF SERVICE

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2020, NetApp, Inc.

BACKGROUND

Field

Various embodiments of the present disclosure generally relate to data management in a data storage system. In particular, some embodiments relate to systems and techniques to implement load balancing in a storage system.

Description of the Related Art

Some data storage architectures store client data in a structure referred to as a volume. A client can access client data from a volume via one or more volume servers communicatively coupled to the volume. The volume servers can map the locations of the data specified by the client, such as file name, drive name, etc., into unique identifiers that are specific to the location of the client data on the volume. Using the volume server as an interface to the volume allows the freedom to distribute data evenly over one or more volumes in a storage system. Managing distribution of data can be beneficial in terms of volume and system performance.

SUMMARY

Systems and methods are described for providing centralized quality of service (QoS) management are described and claimed. According to one embodiment, a method may be performed by one or more processing resources of one or more computer systems. The method comprises collecting, from a plurality of volumes on a per-volume basis, one or more real-time performance metrics for one or more compute processes executing on the one or more computer systems, generating an inertial parameter for one or more volumes in the plurality of volumes, and generating an instruction that cause a processor to use the real-time performance metrics and the inertial parameter to determine whether to transfer responsibility for a compute process on a first storage server node to a second storage server node.

In another embodiment, a system comprises a processing resource and a non-transitory computer-readable medium, coupled to the processing resource, having stored therein instructions that when executed by the processing resource cause the processing resource to collect, from a plurality of volumes on a per-volume basis, one or more real-time performance metrics for one or more compute processes executing on the one or more computer systems, generate an inertial parameter for one or more volumes in the plurality of volumes, and generate an instruction that cause a processor to use the real-time performance metrics and the inertial parameter to determine whether to transfer responsibility for a compute process on a first storage server node to a second storage server node.

In another embodiment, a non-transitory computer-readable storage medium embodying a set of instructions, which when executed by a processing resource cause the processing resource to collect, from a plurality of volumes on a per-volume basis, one or more real-time performance metrics for one or more compute processes executing on the one or more computer systems, generate an inertial parameter for one or more volumes in the plurality of volumes, and generate an instruction that cause a processor to use the real-time performance metrics and the inertial parameter to determine whether to transfer responsibility for a compute process on a first storage server node to a second storage server node.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Systems and methods are described for providing dynamic load balancing by analyzing performance of volume to quality of service (QoS) in a distributed computing system are described herein. In some instances, input/output (I/O) operations into storage nodes of a distributed computing system can generate hot spots in which storage services may be overloaded, thereby reducing performance of the system. This can be particularly troubling when load-balancing metrics are not measured in real-time. To address this and other issues, performance metrics for one or more compute processes may be collected from a plurality of storage volumes on a per-volume basis. In addition, an inertial parameter may be generated for one or more of the plurality of storage volumes. The inertial parameter may be used to determine whether a volume should be available for rebalancing operations. In some embodiments an inertial parameter represents a resistance to rebalancing operations, such that higher inertial parameters indicate greater resistance to rebalancing operations. The performance metrics may be used to perform load balancing operations by shifting volume compute responsibilities (i.e., read/write, hashing, compression) between storage services and/or protection domains.

Various embodiments described herein seek to improve technological processes associated with managing compute resources in a distributed computer system. More particularly, embodiments described herein seek to improve on infrastructure and techniques to provide dynamic load balancing between volumes and/or protection domains in a distributed computing system.

Various embodiments of the present technology provide for a wide range of technical effects, advantages, and/or improvements to computing systems and components. For example, various embodiments may include one or more of the following technical effects, advantages, and/or improvements: 1) improved techniques for managing load balancing processes in storage components of a distributed computing system; 2) the generation of inertial parameters that may be used to remove a storage volume from the pool of volumes eligible for load balancing operations; and 3) the use of real-time performance metrics in load balancing operations.

According to one embodiment, a system collects, from a plurality of volumes on a per-volume basis, one or more real-time performance metrics for one or more compute processes executing on the one or more computer systems, generates an inertial parameter for one or more volumes in the plurality of volumes, and generating an instruction that cause a processor to use the real-time performance metrics and the inertial parameter to determine whether to transfer responsibility for a compute process on a first storage server node to a second storage server node.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

As used herein, "performance metrics" generally refers to performance, configuration and/or other system data of a processing device. Non-limiting examples of compute load parameters for a distributed computing system include latency, utilization, a number of input output operations per second (IOPS), a slice service (SS) load, Quality of Service (QoS) settings, or any other performance related information.

As used herein, a "normalizing agent" generally refers to an entity which may be embodied in logic instructions executable on one or more processing devices to perform various data processing functions.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Example Data Processing Environment

Figure 1:
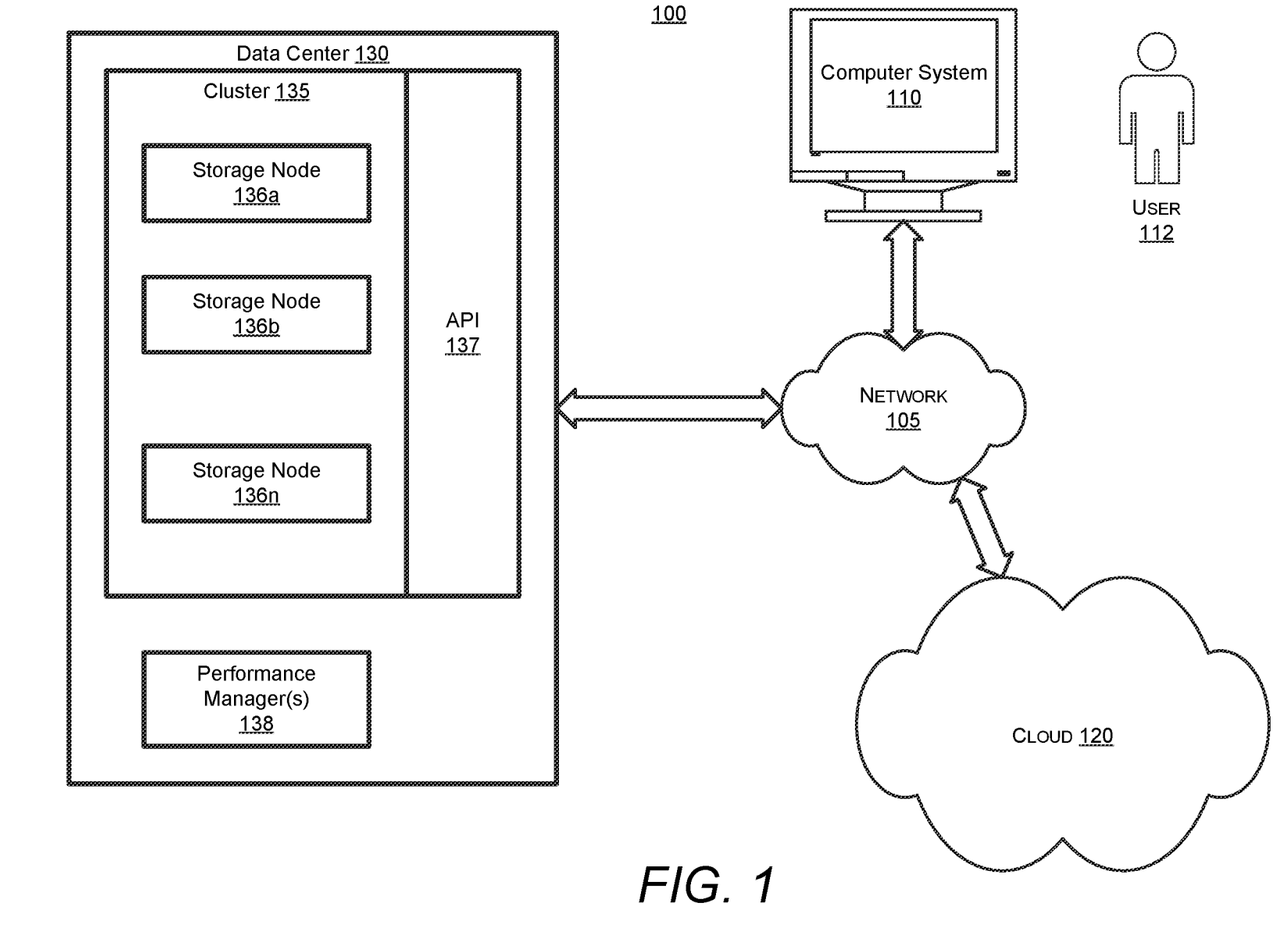
FIG. 1 is a block diagram illustrating a data processing environment in which various embodiments may be implemented.

FIG. 1 is a block diagram illustrating an environment 100 in which various embodiments may be implemented. In various embodiments described herein, an administrator (e.g., user 112) of a distributed storage system (e.g., cluster 135) or a managed service provider responsible for multiple distributed storage systems of the same or multiple customers may monitor various telemetry data of the distributed storage system or multiple distributed storage systems via a browser-based interface presented on computer system 110. In one embodiment, the administrator and/or automated means may use various statistics, analytics and/or visual representations of the gathered data as feedback to improve the functioning of the monitored systems by, for example, tuning various configuration parameters of the managed distributed storage systems and/or delivering storage operating system patches, version upgrades, or the like to the managed distributed storage systems.

In the context of the present example, the environment 100 includes a data center 130, a cloud 120, a computer system 110, and a user 112. The data center 130, the cloud 120, and the computer system 110 are coupled in communication via a network 105, which, depending upon the particular implementation, may be a Local Area Network (LAN), a Wide Area Network (WAN), or the Internet.

The data center 130 may represent an enterprise data center (e.g., an on-premises customer data center) that is build, owned, and operated by a company or the data center 130 may be managed by a third party (or a managed service provider) on behalf of the company, which may lease the equipment and infrastructure. Alternatively, the data center 130 may represent a colocation data center in which a company rents space of a facility owned by others and located off the company premises. The data center 130 is shown including a distributed storage system (e.g., cluster 135) and a performance manager 138. Those of ordinary skill in the art will appreciate additional IT infrastructure would typically be part of the data center 130; however, discussion of such additional IT infrastructure is unnecessary to the understanding of the various embodiments described herein.

As illustrated in the embodiments shown in FIG. 1, the cluster 135 can include multiple storage nodes 136a-n and an Application Programming Interface (API) 137. In the context of the present example, the multiple storage nodes 136a-n are organized as a cluster and provide a distributed storage architecture to service storage requests issued by one or more clients (not shown) of the cluster. The data served by the storage nodes 136a-n may be distributed across multiple storage units embodied as persistent storage devices, including but not limited to hard disk drives, solid state drives, flash memory systems, or other storage devices. A non-limiting example of a storage node 136 is described in further detail below with reference to FIG. 2.

Figure 2:
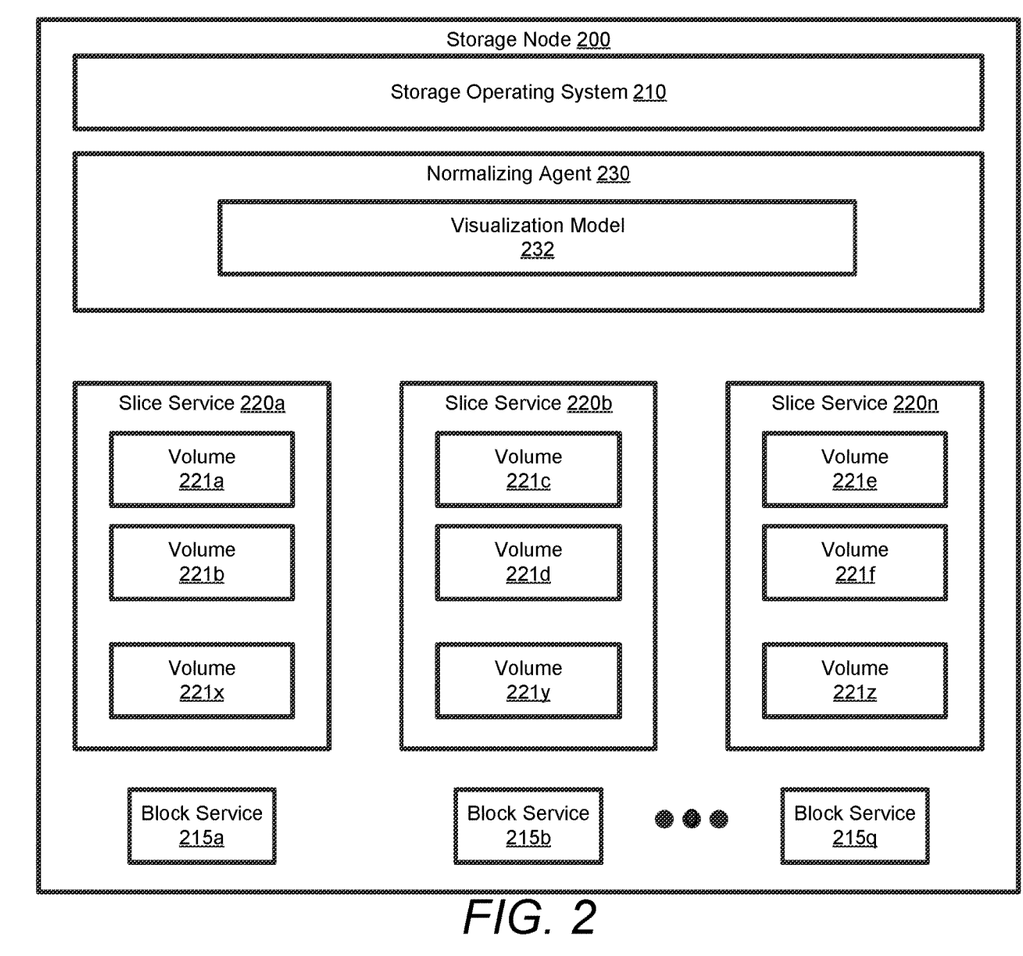
FIG. 2 is a block diagram illustrating a storage node in accordance with an embodiment of the present disclosure.

The API 137 may provide an interface through which the cluster 135 is configured and/or queried by external actors (e.g., the performance manager 138, the computer system 110, and a cloud-based, centralized normalizing agent (e.g., normalizing agent 230 shown in FIG. 2). Depending upon the particular implementation, the API 137 may represent a Representational State Transfer (REST)ful API that uses Hypertext Transfer Protocol (HTTP) methods (e.g., GET, POST, PATCH, DELETE, and OPTIONS) to indicate its actions. Depending upon the particular embodiment, the API 137 may provide access to various telemetry data (e.g., performance, configuration and other system data) relating to the cluster 135 or components thereof. In one embodiment, a first API call (e.g., GetNodeStats) may be used to obtain information regarding a custom, proprietary, or standardized measure of the overall load (e.g., SS load) or overall performance (e.g., IOPS) of a particular storage node 136 or a second API call (e.g., ListNodeStats) may be used to obtain information regarding the overall load or performance of multiple storage nodes 136. As those skilled in the art will appreciate various other types of telemetry data may be made available via the API 137, including, but not limited to measures of latency, utilization, and/or performance at various levels (e.g., the cluster level, the storage node level, or the storage node component level).

In various embodiments, the storage node(s) 136a, 136b, 136n may comprise or be communicatively coupled to a performance manager 138. Performance manager 138 may be implemented locally within the same data center in which the cluster 135 resides as illustrated in FIG. 1. In other embodiments, performance manager 138 may be located external to cluster 135. Performance manager 138 can be configured to periodically poll and/or monitor for compute load parameters of the cluster 135 via the API 137. In some examples the polling may be performed on static periodic intervals. In other examples the polling interval may vary based upon one or more parameters (e.g., load, capacity, etc.). Depending upon the particular implementation, the polling may be performed at a predetermined or configurable interval (e.g., X milliseconds or Y seconds). The performance manager 138 may locally process and/or aggregate the collected compute load parameters (e.g., latency, utilization, IOPS, SS load, Quality of Service (QoS) settings, etc.) over a period of time by data point values and/or by ranges of data point values and provide frequency information regarding the aggregated compute load parameters retrieved from the cluster 135 to the normalizing agent 230.

While for sake of brevity, only a single data center and a single cluster are shown in the context of the present example, it is to be appreciated that multiple clusters owned by or leased by the same or different companies may be monitored in accordance with the methodologies described herein and such clusters may reside in multiple data centers of different types (e.g., enterprise data centers, managed services data centers, or colocation data centers).

Example Storage Node

FIG. 2 is a block diagram illustrating a storage node 200 in accordance with an embodiment of the present disclosure. Storage node 200 represents a non-limiting example of storage nodes 136a-n. In the context of the present example, storage node 200 includes a storage operating system 210, one or more slice services 220a-n, and one or more block services 215a-q. The storage operating system (OS) 210 may provide access to data stored by the storage node 200 via various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. A non-limiting example of the storage OS 210 is NetApp Element Software (e.g., the SolidFire Element OS) based on Linux and designed for SSDs and scale-out architecture with the ability to expand up to 100 storage nodes.

In some embodiments, the storage node 200 may comprise one or more centralized normalizing agents (e.g., normalizing agent 230). The normalizing agent 230 may receive (e.g., periodically, continuously, or on a set schedule) monitored information, including raw and/or processed compute load parameters (e.g., frequency distributions representing aggregated compute load parameters over time) of multiple clusters (e.g., cluster 135 in FIG. 1) from multiple distributed performance managers (e.g., performance manager 138 in FIG. 1) operable within respective data centers (e.g., data center 130 in FIG. 1) of one or more customers of the managed service provider. Depending upon the particular implementation, the monitored information may be pushed from the performance manager 138 or pulled from the performance manager 138 in accordance with a monitoring schedule or responsive to an event (e.g., a request issued by user 112 to the normalizing agent 230).

Each slice service 220 may include one or more volumes (e.g., volumes 221a-x, volumes 221c-y, and volumes 221e-z). Client systems (not shown) associated with an enterprise may store data to one or more volumes, retrieve data from one or more volumes, and/or modify data stored on one or more volumes.

The slice services 220a-n and/or the client system may break data into data blocks. Block services 215a-q and slice services 220a-n may maintain mappings between an address of the client system and the eventual physical location of the data block in respective storage media of the storage node 200. In one embodiment, volumes 221a-z include unique and uniformly random identifiers to facilitate even distribution of a volume's data throughout a cluster (e.g., cluster 135). The slice services 220a-n may store metadata that maps between client systems and block services 215. For example, slice services 220a-n may map between the client addressing used by the client systems (e.g., file names, object names, block numbers, etc. such as Logical Block Addresses (LBAs)) and block layer addressing (e.g., block identifiers) used in block services 215. Further, block services 215a-q may map between the block layer addressing (e.g., block identifiers) and the physical location of the data block on one or more storage devices. The blocks may be organized within bins maintained by the block services 215 for storage on physical storage devices (e.g., SSDs).

A bin may be derived from the block ID for storage of a corresponding data block by extracting a predefined number of bits from the block identifiers. In some embodiments, the bin may be divided into buckets or "sublists" by extending the predefined number of bits extracted from the block identifier. A bin identifier may be used to identify a bin within the system. The bin identifier may also be used to identify a particular block service 215a-q and associated storage device (e.g., SSD). A sublist identifier may identify a sublist with the bin, which may be used to facilitate network transfer (or syncing) of data among block services in the event of a failure or crash of the storage node 200. Accordingly, a client can access data using a client address, which is eventually translated into the corresponding unique identifiers that reference the client's data at the storage node 200.

For each volume 221 hosted by a slice service 220, a list of block identifiers may be stored with one block identifier for each logical block on the volume. Each volume may be replicated between one or more slice services 220a-n and/or storage nodes 200, and the slice services for each volume may be synchronized between each of the slice services hosting that volume. Accordingly, failover protection may be provided in case a slice service 220 fails, such that access to each volume may continue during the failure condition.

The above structure allows storing of data evenly across the cluster of storage devices (e.g., SSDs), which allows for performance metrics to be used to manage load in the cluster. For example, if the cluster is under a load meeting or exceeding a particular threshold, clients can be throttled or locked out of a volume by, for example, the storage OS 210 reducing the amount of read or write data that is being processed by the storage node 200.

As noted above, in some embodiments, a performance manager module (e.g., performance manager 138 shown in FIG. 1) may poll an API (e.g., API 137 shown in FIG. 1) of a distributed storage system (e.g., cluster 135 shown in FIG. 1) of which the storage node 200 is a part to obtain various telemetry data of the distributed storage system. The telemetry data may represent performance metrics, configuration and other system data associated with various levels or layers of the cluster or the storage node 200. For example, metrics may be available for individual or groups of storage nodes (e.g., 136a-n), individual or groups of volumes 221, individual or groups of slice services 220, and/or individual or groups of block services 215.

The storage nodes (e.g., storage nodes 136a-n and storage node 200), the performance manager (e.g., performance manager 138), and the monitoring system (e.g., normalizing agent 230) described herein, and the processing described below with reference to the flow diagram of FIG. 4 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms, such as the computer system described with reference to FIG. 5, below.

Example Storage System

Figure 3A:
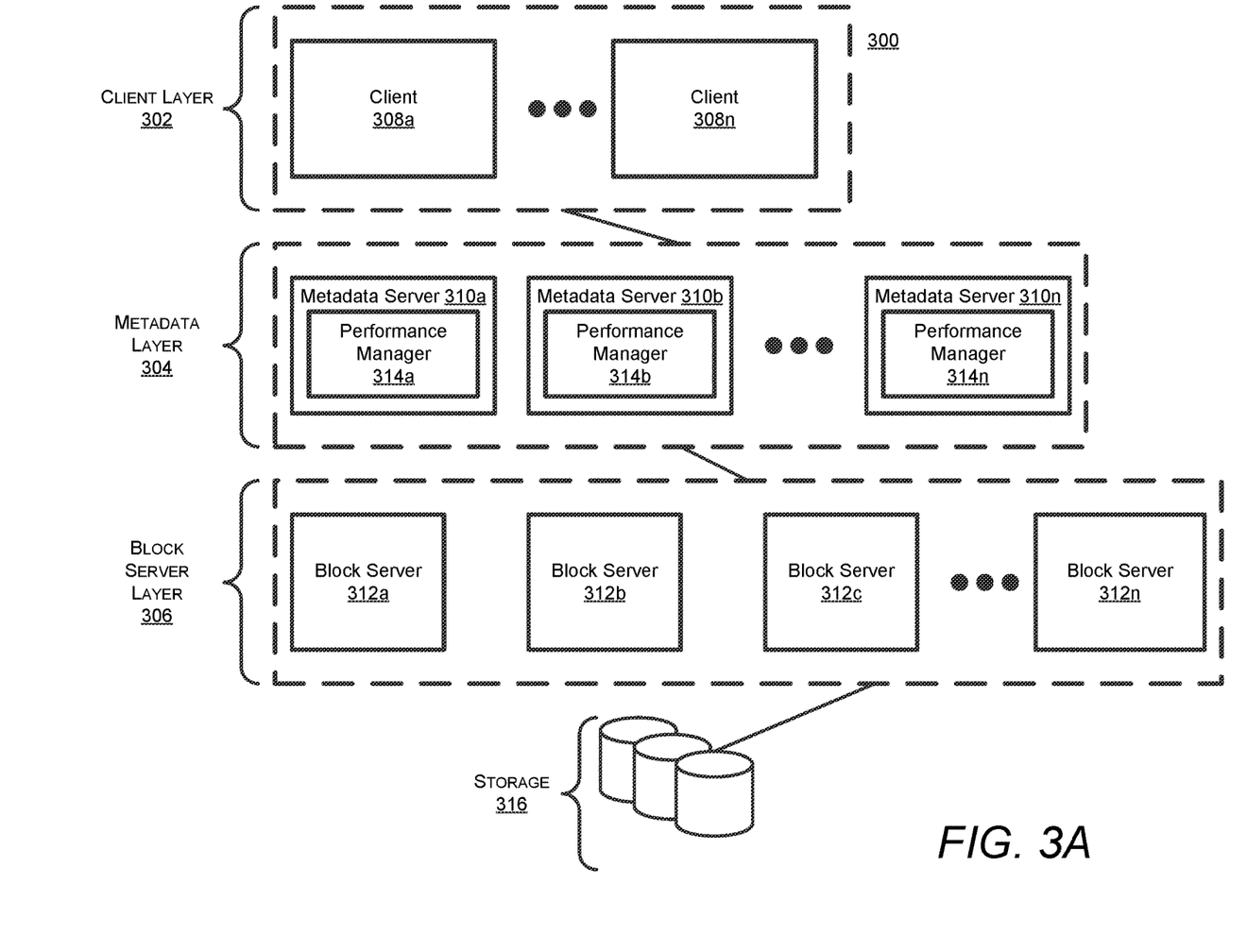
FIG. 3A is a block diagram of a storage system in accordance with an embodiment of the present disclosure.

FIG. 3A depicts a simplified system for centralized QoS management in a storage system 300 in accordance with an illustrative implementation. Storage system 300 includes a client layer 302, a metadata layer 304, a block server layer 306, and storage 316.

Before discussing how particular implementations perform centralized QoS management, the structure of a possible system is described. Client layer 302 includes one or more clients 308a-n. Clients 308a-n include client processes that may exist on one or more physical machines. When the term "client" is used in the disclosure, the action being performed may be performed by a client process. A client process is responsible for storing, retrieving, and deleting data in system 300. A client process may address pieces of data depending on the nature of the storage system and the format of the data stored. For example, the client process may reference data using a client address. The client address may take different forms. For example, in a storage system that uses file storage, each of clients 308a-n may reference a particular volume or partition, and a file name With object storage, the client address may be a unique object name. For block storage, the client address may be a volume or partition, and a block address. Clients 308a-n can communicate with metadata layer 304 using different protocols, such as small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol.

Metadata layer 304 includes one or more metadata servers 310a-n. Performance managers 314a-n may be located on metadata servers 310a-n. Block server layer 306 includes one or more block servers 312a-n. Block servers 312a-n are coupled to storage 316, which stores volume data for clients 308a-n. Each client 308a-n may be associated with a volume. In one implementation, only one client 308a-n may access data in a volume; however, multiple clients 308a-n may access data in a single volume.

Storage 316 can include multiple solid-state drives (SSDs). In one implementation, storage 316 can be a cluster of individual drives coupled together via a network. When the term "cluster" is used, it will be recognized that cluster may represent a storage system that includes multiple disks that may not be networked together. In one implementation, storage 316 uses solid state memory to store persistent data. SSDs use microchips that store data in non-volatile memory chips and contain no moving parts. One consequence of this is that SSDs allow random access to data in different drives in an optimized manner as compared to drives with spinning disks. Read or write requests to non-sequential portions of SSDs can be performed in a comparable amount of time as compared to sequential read or write requests. In contrast, if spinning disks were used, random read/writes would not be efficient since inserting a read/write head at various random locations to read data results in slower data access than if the data is read from sequential locations. Accordingly, using electromechanical disk storage can require that a client's volume of data be concentrated in a small relatively sequential portion of the cluster to avoid slower data access to non-sequential data. Using SSDs removes this limitation.

In various implementations, non-sequentially storing data in storage 316 is based upon breaking data up into one more storage units, e.g., data blocks. A data block, therefore, is the raw data for a volume and may be the smallest addressable unit of data. The metadata layer 304 or the client layer 302 can break data into data blocks. The data blocks can then be stored on multiple block servers 312a-n. Data blocks can be of a fixed size, can be initially a fixed size but compressed, or can be of a variable size. Data blocks can also be segmented based on the contextual content of the block. For example, data of a particular type may have a larger data block size compared to other types of data. Maintaining segmentation of the blocks on a write (and corresponding re-assembly on a read) may occur in client layer 302 and/or metadata layer 304. Also, compression may occur in client layer 302, metadata layer 304, and/or block server layer 306.

In addition to storing data non-sequentially, data blocks can be stored to achieve substantially even distribution across the storage system. In various examples, even distribution can be based upon a unique block identifier. A block identifier can be an identifier that is determined based on the content of the data block, such as by a hash of the content. The block identifier is unique to that block of data. For example, blocks with the same content have the same block identifier, but blocks with different content have different block identifiers. To achieve even distribution, the values of possible unique identifiers can have a uniform distribution. Accordingly, storing data blocks based upon the unique identifier, or a portion of the unique identifier, results in the data being stored substantially evenly across drives in the cluster.

Because client data, e.g., a volume associated with the client, is spread evenly across all of the drives in the cluster, every drive in the cluster is involved in the read and write paths of each volume. This configuration balances the data and load across all of the drives. This arrangement also removes hot spots within the cluster, which can occur when client's data is stored sequentially on any volume.

In addition, having data spread evenly across drives in the cluster allows a consistent total aggregate performance of a cluster to be defined and achieved. This aggregation can be achieved since data for each client is spread evenly through the drives. Accordingly, a client's 110 will involve all the drives in the cluster. Since all clients have their data spread substantially evenly through all the drives in the storage system, a performance of the system can be described in aggregate as a single number, e.g., the sum of performance of all the drives in the storage system.

Block servers 312a-n and slice servers 324 (FIG. 3B) maintain a mapping between a block identifier and the location of the data block in a storage medium of block server 312. A volume includes these unique and uniformly random identifiers, and so a volume's data is also evenly distributed throughout the cluster.

Metadata layer 304 stores metadata that maps between client layer 302 and block server layer 306. For example, metadata servers 310 map between the client addressing used by one or more clients 308a . . . nn (e.g., file names, object names, block numbers, etc.) and block layer addressing (e.g., block identifiers) used in block server layer 306. Clients 308a . . . n may perform access based on client addresses. However, as described above, block servers 312 store data based upon identifiers and do not store data based on client addresses. Accordingly, a client can access data using a client address which is eventually translated into the corresponding unique identifiers that reference the client's data in storage 316.

Although the parts of system 300 are shown as being logically separate, entities may be combined in different fashions. For example, the functions of any of the layers may be combined into a single process or single machine (e.g., a computing device) and multiple functions or all functions may exist on one machine or across multiple machines. Also, when operating across multiple machines, the machines may communicate using a network interface, such as a local area network (LAN) or a wide area network (WAN). In one implementation, one or more metadata servers 310 may be combined with one or more block servers 312 in a single machine. Entities in system 300 may be virtualized entities. For example, multiple virtual block servers 312 may be included on a machine. Entities may also be included in a cluster, where computing resources of the cluster are virtualized such that the computing resources appear as a single entity.

Figure 3B:
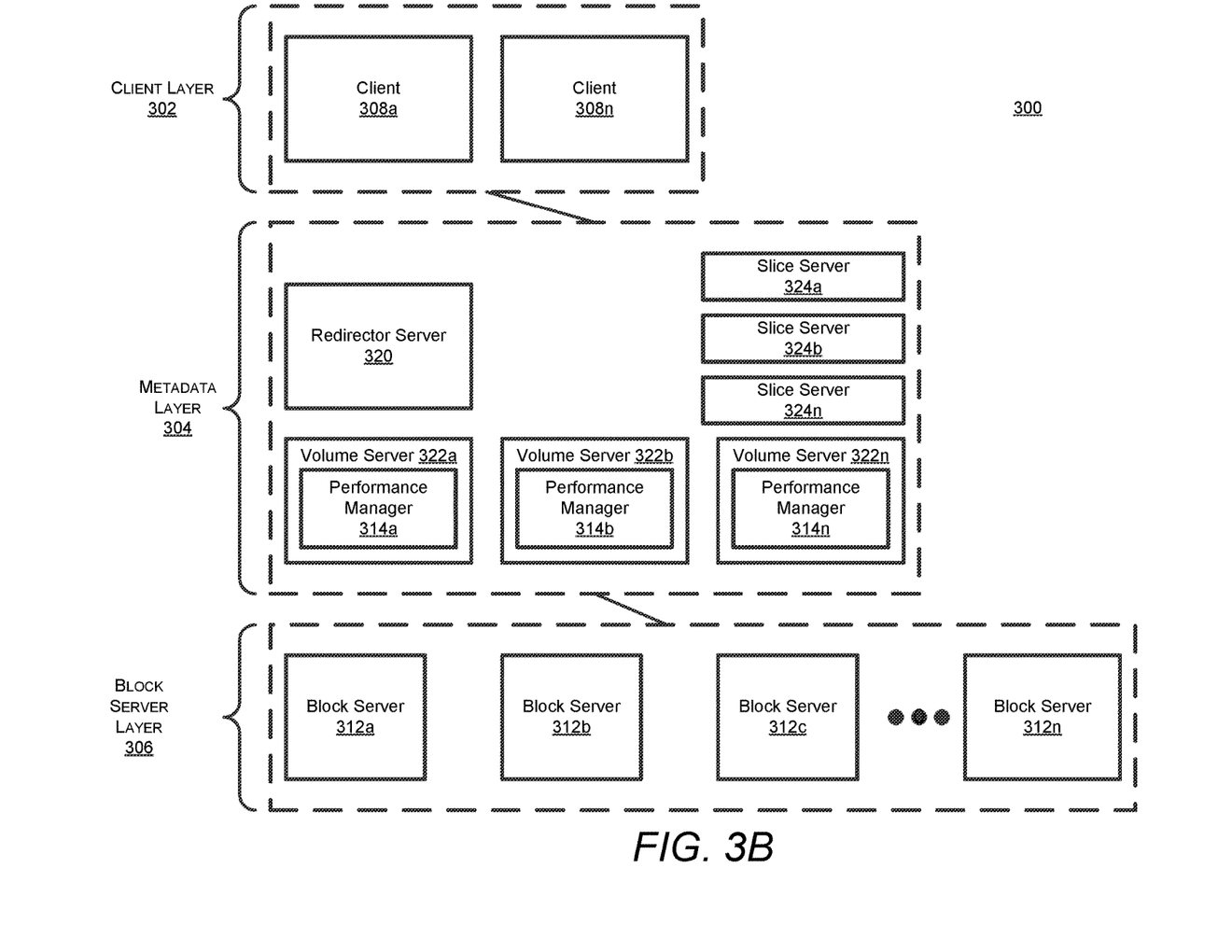
FIG. 3B is a more detailed block diagram of a storage system in accordance with an embodiment of the present disclosure.

FIG. 3B depicts a more detailed example of system 300 according to one implementation. Metadata layer 304 may include a redirector server 320 and multiple volume servers 322. Each volume server 322 may be associated with a plurality of slice servers 324.

In this example, client 308a wants to connect to a volume (e.g., client address). Client 308a communicates with redirector server 320, identifies itself by an initiator name, and also indicates a volume by target name that client 308a wants to connect to. Different volume servers 322 may be responsible for different volumes. In this case, redirector server 320 is used to redirect the client to a specific volume server 322. To client 308, redirector server 320 may represent a single point of contact. The first request from client 308a then is redirected to a specific volume server 322. For example, redirector server 320 may use a database of volumes to determine which volume server 322 is a primary volume server for the requested target name. The request from client 308a is then directed to the specific volume server 322 causing client 308a to connect directly to the specific volume server 322. Communications between client 308a and the specific volume server 322 may then proceed without redirector server 320.

Volume server 322 performs functions as described with respect to metadata server 310. Additionally, each volume server 322 includes a performance manager 314. For each volume hosted by volume server 322, a list of block identifiers is stored with one block identifier for each logical block on the volume. Each volume may be replicated between one or more volume servers 322 and the metadata for each volume may be synchronized between each of the volume servers 322 hosting that volume. If a volume server 322a . . . n fails, redirector server 320 may direct a client 308a . . . n to an alternate volume server 322a . . . n.

In one implementation, the metadata being stored on volume server 322 may be too large for one volume server 322. Thus, multiple slice servers 324 may be associated with each volume server 322. The metadata may be divided into slices and a slice of metadata may be stored on each slice server 324. When a request for a volume is received at volume server 322, volume server 322 determines which slice server 324 contains metadata for that volume. Volume server 322 then routes the request to the appropriate slice server 324. Accordingly, slice server 324 adds an additional layer of abstraction to volume server 322.

The above structure allows storing of data evenly across the cluster of disks. For example, by storing data based on block identifiers, data can be evenly stored across drives of a cluster. As described above, data evenly stored across the cluster allows for performance metrics to manage load in system 300. If the system 300 is under a load, clients can be throttled or locked out of a volume. When a client is locked out of a volume, metadata server 310 or volume server 322 may close the command window or reduce or zero the amount of read or write data that is being processed at a time for a client 308a . . . n. The metadata server 310 or the volume server 322a . . . n can queue access requests for client 308a . . . n, such that IO requests from the client 308a . . . n can be processed after the client's access to the volume resumes after the lock out period.

In some examples, the storage system 300 can also include one or more performance managers 314a . . . n that can monitor the use of the storage system's resources by both client processes and background processes. In addition, a performance manager 314a . . . n can facilitate regulating use of the storage system 300 by both client processes and background processes. The use of the storage system can be adjusted based upon performance metrics, the client's quality of service parameters, and the load of the storage system. Performance metrics are various measurable attributes of the storage system. One or more performance metrics can be used to determine load parameters of the system, which, as described in greater detail below, can be used to throttle clients of the system.

Performance metrics can be grouped in different categories of metrics. System metrics is one such category. System metrics are metrics that reflect the use of the system or components of the system by all clients. System metrics can include metrics associated with the entire storage system or with components within the storage system. For example, system metrics can be calculated at the system level, cluster level, node level, service level, or drive level. Space utilization is one example of a system metric. The cluster space utilization reflects how much space is available for a particular cluster, while the drive space utilization metric reflects how much space is available for a particular drive. Space utilization metrics can also be determined for at the system level, service level, and the node level. Other examples of system metrics include measured or aggregated metrics such as read latency, write latency, input/output operations per second (IOPS), read IOPS, write IOPS, I/O size, write cache capacity, dedupe-ability, compressibility, total bandwidth, read bandwidth, write bandwidth, read/write ratio, workload type, data content, data type, etc.

IOPS can be real input/output operations per second that are measured for a cluster or drive. Bandwidth may be the amount of data that is being transferred between clients 308 and the volume of data. Read latency can be the time taken for the system 300 to read data from a volume and return the data to a client. Write latency can be the time taken for the system to write data and return a success indicator to the client. Workload type can indicate if IO access is sequential or random. The data type can identify the type of data being accessed/written, e.g., text, video, images, audio, etc. The write cache capacity refers to a write cache or a node, a block server, or a volume server. The write cache is relatively fast memory that is used to store data before it is written to storage 316. As noted above, each of these metrics can be independently calculated for the system, a cluster, a node, etc. In addition, these values can also be calculated at a client level.

Client metrics are another category of metrics that can be calculated. Unlike system metrics, client metrics are calculated taking into account the client's use of the system. As described in greater detail below, a client metric may include use by other client's that are using common features of the system. Client metrics, however, will not include use of non-common features of the system by other clients. In one implementation, client metrics can include the same metrics as the system metrics, but rather than being component or system wide, are specific to a volume of the client. For example, metrics such as read latency or write IOPS can be monitored for a particular volume of a client.

Background process metrics is another category of metrics that can be calculated. Background process metrics include metrics associated with background processes executed by the system. Examples of background processes include bin synchronization processes, slice balancing process, slice synchronization processes, cluster fault monitoring processes, and the like.

Metrics, including system metrics, background process metrics, and client metrics, can be calculated over a period of time (e.g., 250 ms, 500 ms, 1 s, etc). Accordingly, different statistical values (e.g., a min, max, standard deviation, average, etc.) can be calculated for each metric. One or more of the metrics can be used to calculate a value that represents one or more compute load parameters of the storage system. Load parameters can be calculated for the entire storage system, for individual components, for individual services, and/or individual clients. Compute load parameter values (e.g., system load values and/or client load values) can then be used by the normalizing agent 230 to determine if and how various processes should be managed (i.e., throttled) to achieve QoS goals for particular client processes.

As described in greater detail below, compute resource allocation for background processes can be adjusted based upon the compute load parameters. For example, based on a number of factors, such as system metrics, client metrics, background process metrics, and client quality of service parameters, a computer resource allocation dedicated to one or more background compute processes may be adjusted, e.g., to achieve a target QoS parameter associated with a client system.

Figure 3C:
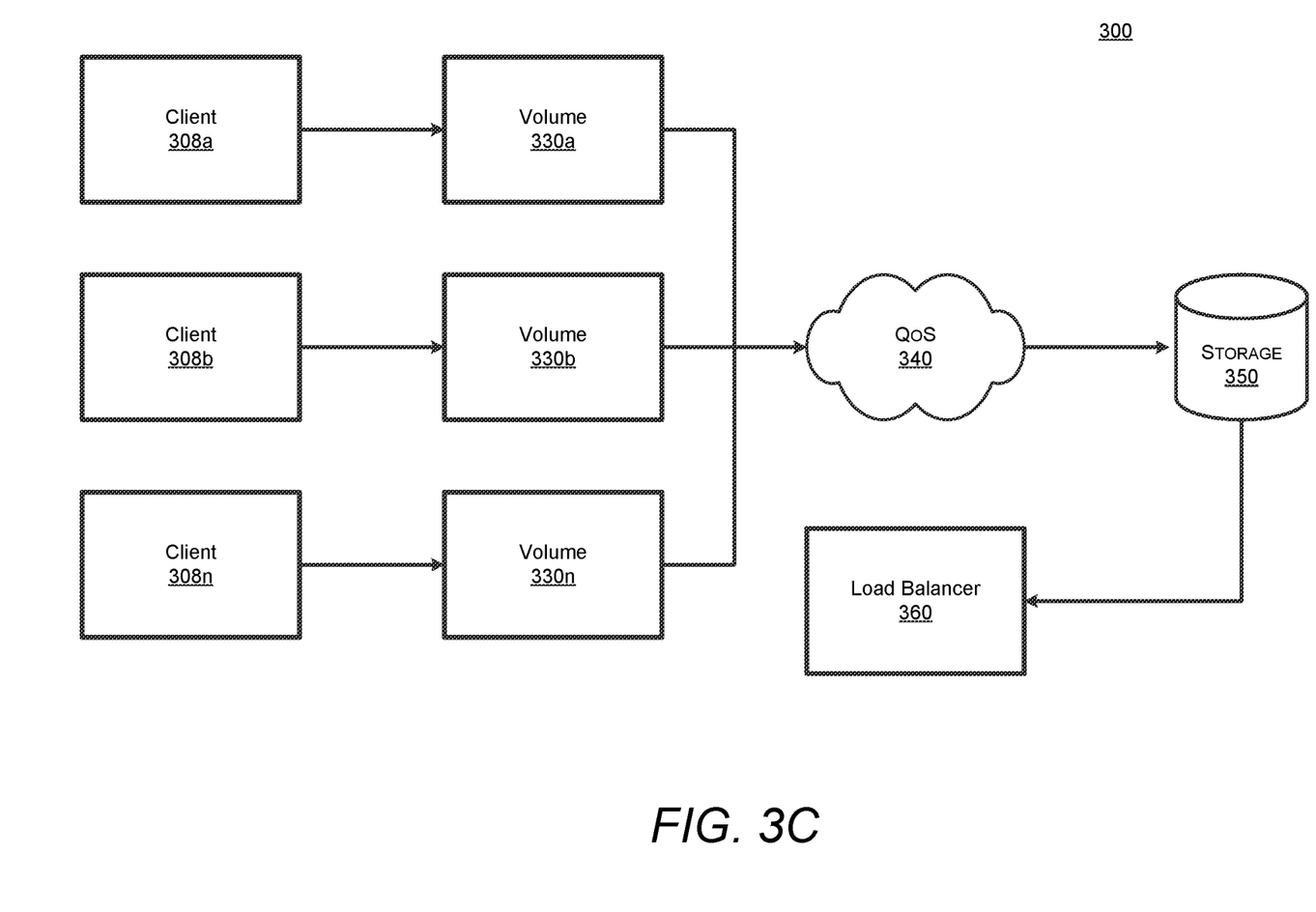
FIG. 3C is a block diagram of components of a storage system in accordance with an embodiment of the present disclosure.

FIG. 3C is a block diagram of components of a system 300 in accordance with an embodiment of the present disclosure. Referring to FIG. 3C, in some examples a number of clients in the storage system utilize the services of a number of volumes in the system 300. In the system 300 depicted in FIG. 3, the client 308a utilizes storage services of a volume 330a, a client 308b utilizes storage services of a volume 330b, and a client 308n utilizes storage services of a volume 330n. In some embodiments, the volumes may exist in multiple different protection domains. For example, volume 330a may exist in a first protection domain, volume 330b may exist in a second protection domain, and volume 330n may exist in a third protection domain. A protection domain may have one volume or multiple volumes.

In some examples a cloud-based QoS system may collect, from a plurality of the volumes 330a, 330b, 330n, on a per-volume basis, one or more real-time performance metrics for one or more compute processes executing on the one or more computer systems. In some embodiments, the one or more compute processes comprises at least one of a client process, a bin synchronization process, a slice balancing process, or a cluster fault monitoring process executing on the volume. Further, in some examples the one or more real-time performance metrics comprises at least one of a percentage of processor utilization metric, an input/output (I/O) throughput metric, an average I/O size metric, an average read latency, or an average write latency. The performance metrics may be stored in a suitable storage container 350 and may be provided to load balancer 360.

As described in greater detail below, the load balancer 360 may implement load balancing for compute processes based upon the monitored metrics. For example, based on a number of factors, such as system metrics, client metrics, background process metrics, and client quality of service parameters, a compute load allocation may be adjusted, e.g., responsibility for a compute process on a first storage server node may be transferred to a second storage server node.

Load Balancer Processing

Figure 4:
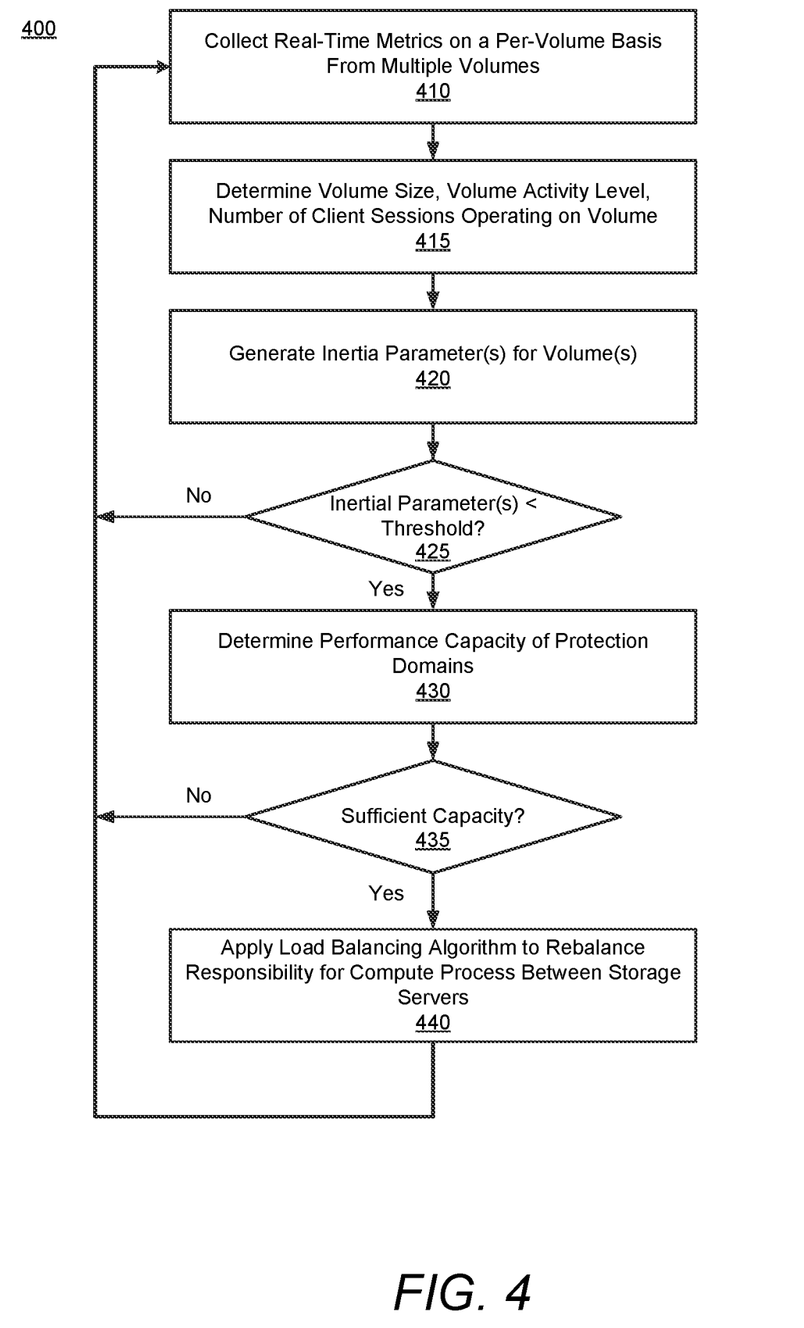
FIG. 4 is a flow diagram illustrating operations in a technique to implement dynamic load balancing by analyzing performance of volume to quality of service (QoS) in accordance with an embodiment of the present disclosure.

FIG. 4 is a flow diagram illustrating operations in a process 400 to implement dynamic load balancing by analyzing performance of volume to quality of service (QoS) in accordance with an embodiment of the present disclosure. Depending upon the particular implementation some portion or all of the distribution visualization processing may be performed by the QoS system 340 and/or a remote administrative station (e.g., computer system 110).

Referring to FIG. 4, at block 410 one or more real-time performance metrics for one or more compute processes executing on the one or more computer systems are collected from a plurality of volumes on a per-volume basis. In some embodiments, metrics may be collected on a periodic basis. The period may be static or may vary with operational conditions. In some embodiments the collection frequency is configurable, but defaults to every 500 ms. Collection happens simultaneously on each node of a storage system, and occurs within the slice service of each storage node.

As described above, in some embodiments the one or more compute processes may comprise at least one of a bin synchronization process, a slice balancing process, or a cluster fault monitoring process, and the one or more real-time performance metrics comprises at least one of a percentage of processor utilization metric, an input/output (I/O) throughput metric, an average I/O size metric, an average read latency, or an average write latency.

At block 415, at least one of a volume size, a volume activity level, or a number of client sessions operating on a volume is determined. In some embodiments this data is part of the information the QoS system is collecting on a periodic basis e.g., every 500 ms. At block 420, one or more inertial parameters are generated for the volumes 330a, 330b, . . . 330n.

In some embodiments, the inertial parameter(s) may be generated by applying one or more weighting factor(s) to the parameters determined in operation 415 and may be generated for one or more of the parameters collected and may be used to adjust the relative weight assigned to the parameters in subsequent processing. In some embodiments these inertial parameters may be determined by weightings that resulted in a beneficial mix of reactivity to changing workloads and correctness (i.e., optimal distribution of volumes). In some examples the volume size, may be determined by dividing the score for the current reassignment in question by a parameter that corresponds to the square root of the volume size. Thus, the larger the volume size the lower the score. Of course, other roots may be used. The root value may be configurable between, e.g., 0-100. Setting the root value to 100 gives the volume size more influence, setting it to 0 gives the volume size no influence (i.e., scores are the same regardless of the size of the volume).

In some examples an exponential moving average (EMA) may be determined across the performance metrics. For example, a 30% EMA may be used such that recent samples of performance are only weighted at 30% versus all past historic samples being weighted at 70%. This allows for a smooth adaptation to changing workloads. Other metrics may be considered in determining the inertial parameters.

In some embodiments, the inertial parameter may be used as part of a cost/benefit calculation to determine whether the costs of moving processes from a particular volume outweigh the potential benefits of moving the processes from the particular volume. For example, in some instances redistribution of existing processes may impose too extensive a load on the central processing unit (CPU) of the system or may consume too much bandwidth to justify the transfer of the processes. In general, a higher inertial parameter indicates that there is less benefit to obtain by transferring the processes to a different volume.

At block 425, it is determined whether the inertial parameter(s) for the respective volume(s) generated in block 420 are less than a threshold. In some examples the threshold may be a static threshold, while in other examples the threshold may be set dynamically as a function of operating conditions of the system 300. For example, if heavyweight background operations are running (e.g., slice sync, bin sync, garbage collection, etc.) this threshold may be decreased to make it less likely that a volume will be moved amidst those conditions.

If, at block 425, the inertial parameter for a given volume is not less than the threshold then control passes back to block 410 and the process 400 continues to collect metrics for that volume. By contrast, if at operation 425 the inertial parameter for a given volume is less than the threshold then control passes to block 430 and a performance capacity of one or more protection domains in the system is determined. If no other domain has capacity for the volume, then no reassignments are made and the volume remain in their current configuration. As used herein, a "protection domain" refers to a single storage server node in a storage system.

If, at operation 435, a protection domain does not have sufficient performance capacity to accept additional volumes, then control passes back to block 410 and the process 400 continues to collect metrics. By contrast, if at operation 435 a protection domain has sufficient performance capacity to accept additional volumes, then control passes to operation 440 and a load balancing algorithm is applied to rebalance compute load between available protection domains. In some examples an instruction may be generated that causes a processor to use the real-time performance metrics and the inertia parameter to determine whether to transfer responsibility for a compute process on a first storage server node to a second storage server node.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 5:
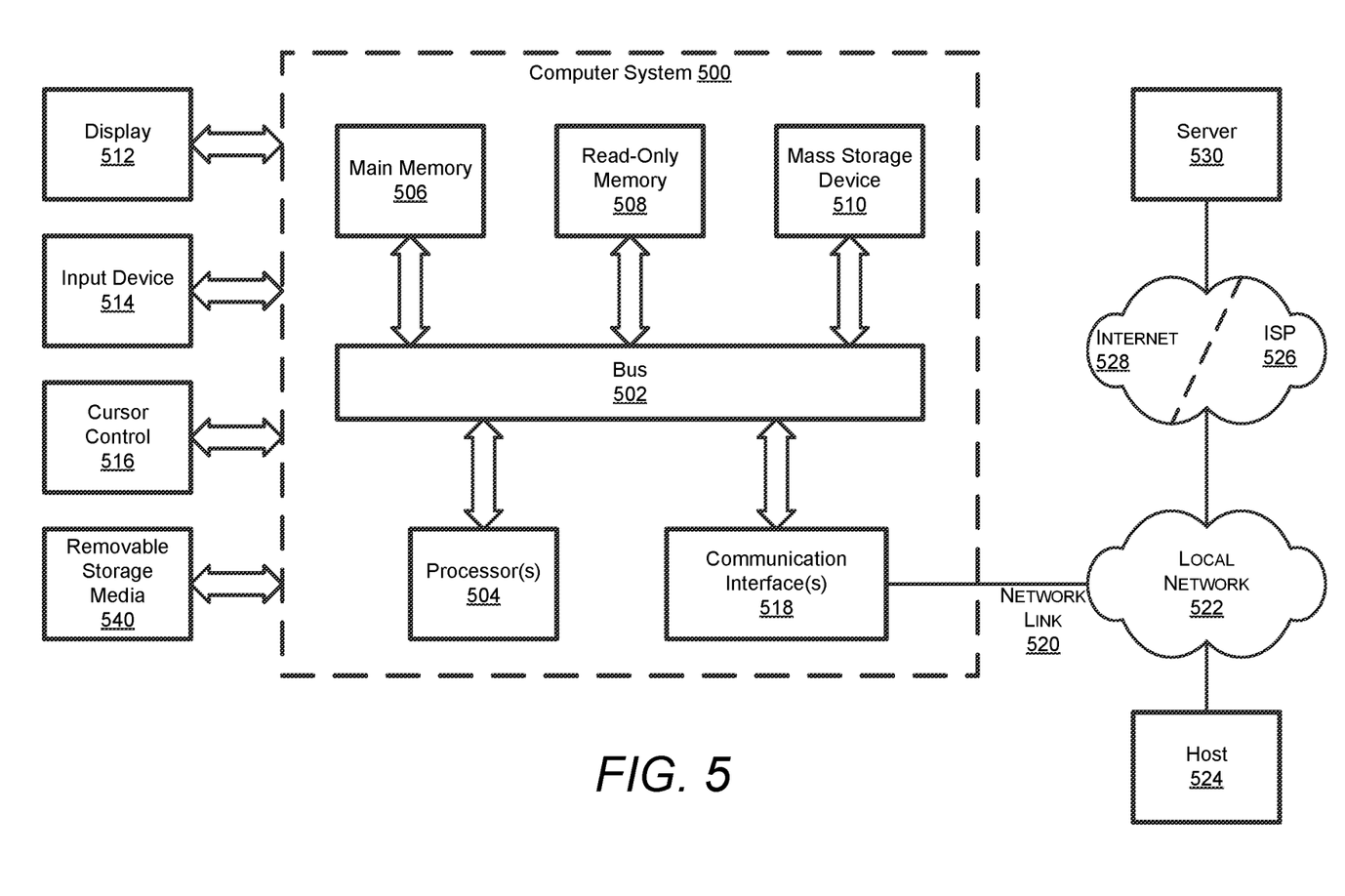
FIG. 5 illustrates an example computer system in which or with which embodiments of the present disclosure may be utilized.

FIG. 5 is a block diagram that illustrates a computer system 500 in which or with which an embodiment of the present disclosure may be implemented. Computer system 500 may be representative of all or a portion of the computing resources associated with a storage node (e.g., storage node 136), a performance manager (e.g., performance manager 138), a monitoring system (e.g., monitoring system 230) or an administrative work station (e.g., computer system 110). Notably, components of computer system 500 described herein are meant only to exemplify various possibilities. In no way should example computer system 500 limit the scope of the present disclosure. In the context of the present example, computer system 500 includes a bus 502 or other communication mechanism for communicating information, and a processing resource (e.g., a hardware processor 504) coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, e.g., a magnetic disk, optical disk or flash disk (made of flash memory chips), is provided and coupled to bus 502 for storing information and instructions.

Computer system 500 may be coupled via bus 502 to a display 512, e.g., a cathode ray tube (CRT), Liquid Crystal Display (LCD), Organic Light-Emitting Diode Display (OLED), Digital Light Processing Display (DLP) or the like, for displaying information to a computer user. An input device 514, including alphanumeric and other keys, is coupled to bus 502 for communicating information and command selections to processor 504. Another type of user input device is cursor control 516, such as a mouse, a trackball, a trackpad, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Removable storage media 540 can be any kind of external storage media, including, but not limited to, hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM), USB flash drives and the like.

Computer system 500 may implement the techniques described herein using customized hard-wired logic, one or more ASICs or FPGAs, firmware or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 510. Volatile media includes dynamic memory, such as main memory 506. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, or stored in storage device 510, or other non-volatile storage for later execution.

What is claimed is:

1. A method performed by one or more processing resources of one or more computer systems, the method comprising:
    collecting, from a plurality of volumes of a distributed storage system on a per-volume basis, one or more real-time performance metrics for one or more compute processes executing on the one or more computer systems;
    generating an inertial parameter for a volume of the plurality of volumes, wherein the inertial parameter represents a resistance to moving a compute process of the one or more compute processes from the volume in rebalancing operations;
    determining the inertial parameter indicates the compute process should remain on the volume; and
    based on the real-time performance metrics and the inertial parameter, rebalancing a compute load within the distributed storage system, wherein the compute load includes ones of the one or more processes other than the compute process.

2. The method of claim 1, wherein the one or more compute processes comprises at least one of a client process, a bin synchronization process, a slice balancing process, or a cluster fault monitoring process.

3. The method of claim 1, wherein the one or more real-time performance metrics comprises at least one of a percentage of processor utilization metric, an input/output (I/O) throughput metric, an average I/O size metric, an average read latency, or an average write latency.

4. The method of claim 1, wherein said generating an inertial parameter comprises:
    determining at least one of a volume size, a volume activity level, or a number of client sessions operating on the volume; and
    generating a weighting factor to the at least one of a volume size, a volume activity level, or a number of client sessions operating on the volume.

5. The method of claim 1, wherein determining the inertial parameter indicates the compute process should remain on the volume comprises:
    determining the inertial parameter exceeds a threshold.

6. The method of claim 1, further comprising generating an instruction that causes a processor to determine a performance capacity of one or more protection domains.

7. The method of claim 6, further comprising generating an instruction that causes a processor to apply a load balancing algorithm to rebalance the compute load between the one or more protection domains.

8. A system comprising:
    a processing resource; and
    a non-transitory computer-readable medium, coupled to the processing resource, having stored therein instructions that when executed by the processing resource cause the processing resource to:
        collect, from a plurality of volumes of a distributed storage system on a per-volume basis, one or more real-time performance metrics for one or more compute processes executing on the one or more computer systems;
        generate an inertial parameter for a volume of the plurality of volumes wherein the inertial parameter represents a resistance to moving a compute process of the one or more compute processes from the volume in rebalancing operations;
        determine the inertial parameter indicates the compute process should remain on the volume; and
        based on the real-time performance metrics and the inertial parameter, rebalance a compute load within the distributed storage system, wherein the compute load includes ones of the one or more processes other than the compute process.

9. The system of claim 8, wherein the one or more compute processes comprises at least one of a bin synchronization process, a slice balancing process, or a cluster fault monitoring process.

10. The system of claim 8, wherein the one or more real-time performance metrics comprises at least one of a percentage of processor utilization metric, an input/output (I/O) throughput metric, an average I/O size metric, an average read latency, or an average write latency.

11. The system of claim 8, wherein generation of the inertial parameter comprises:
    determining at least one of a volume size, a volume activity level, or a number of client sessions operating on a volume; and
    generating a weighting factor to the at least one of a volume size, a volume activity level, or a number of client sessions operating on a volume.

12. The system of claim 11, wherein determination that the inertial parameter indicates the compute process should remain on the volume comprises:
    determining the inertial parameter exceeds a threshold.

13. The system of claim 8, wherein the instructions further cause the processing resource to determine a performance capacity of one or more protection domains.

14. The system of claim 13, wherein the instructions further cause the processing resource to apply a load balancing algorithm to rebalance the compute load between the one or more protection domains.

15. A non-transitory computer-readable storage medium embodying a set of instructions, which when executed by a processing resource cause the processing resource to:
    collect, from a plurality of volumes of a distributed storage system on a per-volume basis, one or more real-time performance metrics for one or more compute processes executing on the distributed storage system;
    generate an inertial parameter for a volume of the plurality of volumes, wherein the inertial parameter represents a resistance to moving a compute process of the one or more compute processes from the volume in rebalancing operations;

determine the inertial parameter indicates the compute process should remain on the volume; and based on the real-time performance metrics and the inertial parameter, rebalance a compute load within the distributed storage system, wherein the compute load includes ones of the one or more processes other than the compute process.

16. The non-transitory computer-readable storage medium of claim 15, wherein the one or more compute processes comprises at least one of a bin synchronization process, a slice balancing process, or a cluster fault monitoring process.

17. The non-transitory computer-readable storage medium of claim 15, wherein the one or more real-time performance metrics comprises at least one of a percentage of processor utilization metric, an input/output (I/O) throughput metric, an average I/O size metric, an average read latency, or an average write latency.

18. The non-transitory computer-readable storage medium of claim 15, wherein generation of the inertial parameter comprises:

determining at least one of a volume size, a volume activity level, or a number of client sessions operating on a volume; and generating a weighting factor to the at least one of a volume size, a volume activity level, or a number of client sessions operating on a volume.

19. The non-transitory computer-readable storage medium of claim 18, wherein determination that the inertial parameter indicates the compute process should remain on the volume comprises:

determining the inertial parameter exceeds a threshold.

20. The non-transitory computer-readable storage medium of claim 15, wherein the instructions further cause the processing resource to apply a scale to determine a performance capacity of one or more protection domains.

21. The non-transitory computer-readable storage medium of claim 20, wherein the instructions further cause the processing resource to adjust a compute resource allocation dedicated to the one or more compute processes by applying a load balancing algorithm to rebalance the compute load between the one or more protection domains.

* * * * *